(12) United States Patent
Kameda et al.

(10) Patent No.: US 10,479,061 B2
(45) Date of Patent: Nov. 19, 2019

(54) COMPONENT BONDING DEVICE

(71) Applicant: Panasonic Intellectual Property Management Co., Ltd., Osaka (JP)

(72) Inventors: Akira Kameda, Yamanashi (JP); Shinjiro Tsuji, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 14/743,305

(22) Filed: Jun. 18, 2015

(65) Prior Publication Data
US 2015/0367618 A1  Dec. 24, 2015

(30) Foreign Application Priority Data
Jun. 23, 2014  (JP) ................... 2014-127976

(51) Int. Cl.
| | | |
|---|---|---|
| *B30B 15/30* | (2006.01) | |
| *B32B 37/00* | (2006.01) | |
| *B25J 15/00* | (2006.01) | |
| *B25J 15/06* | (2006.01) | |

(52) U.S. Cl.
CPC ....... *B32B 37/0046* (2013.01); *B25J 15/0052* (2013.01); *B25J 15/0616* (2013.01); *B30B 15/30* (2013.01)

(58) Field of Classification Search
CPC ... B25J 15/0052; B25J 15/0616; B65B 35/38; B65G 47/91; B65G 47/918
USPC ................... 269/21; 294/188; 279/3
See application file for complete search history.

(56) References Cited

U.S. PATENT DOCUMENTS

| | | | | |
|---|---|---|---|---|
| 2,627,338 A * | 2/1953 | Vodoz | ............... | A01K 1/0128 198/729 |
| 4,828,303 A * | 5/1989 | Soria | ............... | B60R 13/04 248/206.3 |
| 5,735,512 A * | 4/1998 | Waddell | ............... | B25B 11/005 269/21 |
| 7,464,807 B2 * | 12/2008 | Ham | ............... | G01R 31/2893 198/468.3 |
| 2002/0088113 A1 * | 7/2002 | Hwang | ............... | G01R 31/01 29/743 |
| 2003/0102879 A1 * | 6/2003 | Cho | ............... | G11C 29/56 324/757.01 |

(Continued)

FOREIGN PATENT DOCUMENTS

| | | |
|---|---|---|
| JP | S58-149216 A | 9/1983 |
| JP | H09-162243 A | 6/1997 |

(Continued)

*Primary Examiner* — Scott W Dodds
(74) *Attorney, Agent, or Firm* — Pearne & Gordon LLP (57) ABSTRACT

A component bonding device includes a bonding tool which sucks a film-like component and which bonds the film-like component to a substrate. The bonding tool includes: a plurality of suction blocks, each of which has a suction hole for sucking the film-like component; and a suction block holding portion which has a block holding-available region capable of holding the plurality of suction blocks, and which holds the plurality of suction blocks so as to be arranged in a row in the block holding-available region. The suction block holding portion allows change of a holding position of at least one of the plurality of suction blocks to any desired position in the block holding-available region.

5 Claims, 8 Drawing Sheets

(56) References Cited

U.S. PATENT DOCUMENTS

2003/0235491 A1* 12/2003 Subotincic ........... B25J 15/0052
414/627
2015/0130201 A1* 5/2015 Crosby ................ B65G 47/918
294/188
2015/0231788 A1* 8/2015 Subotincic ........... B25J 15/0052
414/800

FOREIGN PATENT DOCUMENTS

| JP | 2002-344197 A | 11/2002 |
|---|---|---|
| JP | 2010-272573 A | 12/2010 |
| JP | 2013-42070 A | 2/2013 |
| WO | 2006/118016 A1 | 11/2006 |

* cited by examiner

COMPONENT BONDING DEVICE

CROSS-REFERENCES TO RELATED APPLICATION(S)

This application is based on and claims priority from Japanese Patent Application No. 2014-127976 filed on Jun. 23, 2014, the entire contents of which are incorporated herein by reference.

BACKGROUND

1. Field of the Invention

One or more embodiments of the present invention relate to a component bonding device including a bonding tool which sucks a film-like component and bonds the film-like component to a substrate.

2. Description of Related Art

As a component bonding device which bonds a film-like component to an edge portion of a substrate, there is a component bonding device which includes a bonding tool for sucking and holding the film-like component and bonding the film-like component to the substrate (for example, WO-A1-2006/118016 and JP-A-2013-42070).

SUMMARY

However, in the above-described device component bonding device, a bonding tool is individually manufactured depending on the shape or size of a film-like component. Accordingly, when a plurality of different types of the film-like components are bonding targets, it is necessary to prepare dedicated bonding tools for the respective types of the film-like component. Further, it is necessary to replace the bonding tool each time the type of the film-like component is changed.

An object of one or more embodiments of the present invention is to provide a component bonding device which does not require dedicated bonding tools for respective types of film-like components and also does not require work for replacing the bonding tool at the time of change of the type of film-like component.

One or more embodiments of the invention provide a component bonding device including: a bonding tool that sucks a film-like component and bonds the film-like component to a substrate, wherein the bonding tool includes: a plurality of suction blocks, each of which has a suction hole for sucking the film-like component; and a suction block holding portion which has a block holding-available region capable of holding the plurality of suction blocks, and which holds the plurality of suction blocks so as to be arranged in a row in the block holding-available region, and wherein the suction block holding portion allows change of a holding position of at least one of the plurality of suction blocks to any desired position in the block holding-available region.

According to one or more embodiments of the present invention, it is not necessary to prepare dedicated bonding tools for respective types of film-like components and also not necessary to replace the bonding tool at the time of change of the type of film-like component.

DETAILED DESCRIPTION

Hereinafter, an embodiment of the present invention will be described with reference to the drawings. A component bonding device 1 illustrated in FIG. 1 temporarily bonds a film-like component 3 to a substrate 2 such that a plurality of terminals 3a of the film-like component 3 are placed on and bonded to a plurality of electrode portions 2a provided on an edge portion of the substrate 2. The terminals 3a are provided so as to correspond to the electrode portions 2a. As used herein, the lateral direction of the paper surface of FIG. 1 is referred to as the Y-axis direction (front-rear direction), and the direction perpendicular to the paper surface is referred to as the X-axis direction (left-right direction), and the vertical direction of the paper surface is referred to as the Z-axis direction (up-down direction).

Figure 1:
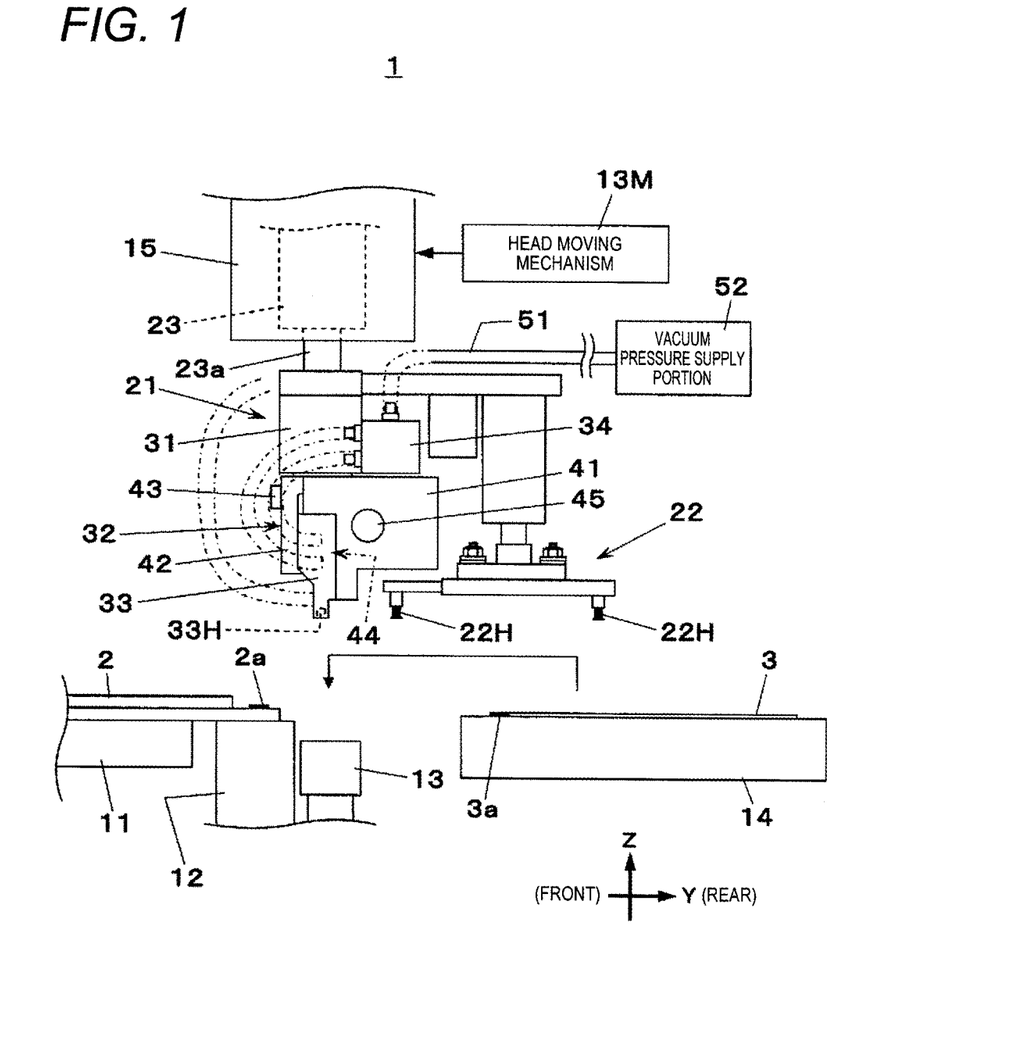
FIG. 1 is a side view of a component bonding device according to an embodiment of the present invention.

In FIG. 1, the component bonding device 1 includes a substrate holding portion 11 which holds the substrate 2, a backup stage 12 which supports a lower side of the electrode portion 2a within a lower surface of the substrate 2 held by the substrate holding portion 11, a camera 13 which is disposed adjacent to the backup stage 12, a component supply portion 14 which supplies the film-like component 3, and a bonding head 15 which picks up the film-like component 3 supplied by the component supply portion 14.

In FIG. 1, the bonding head 15 is moved within a horizontal plane by a head moving mechanism 13M. The bonding head 15 causes a lifting cylinder 23 to move a bonding tool 21 and an auxiliary tool 22 up and down.

Figure 2:
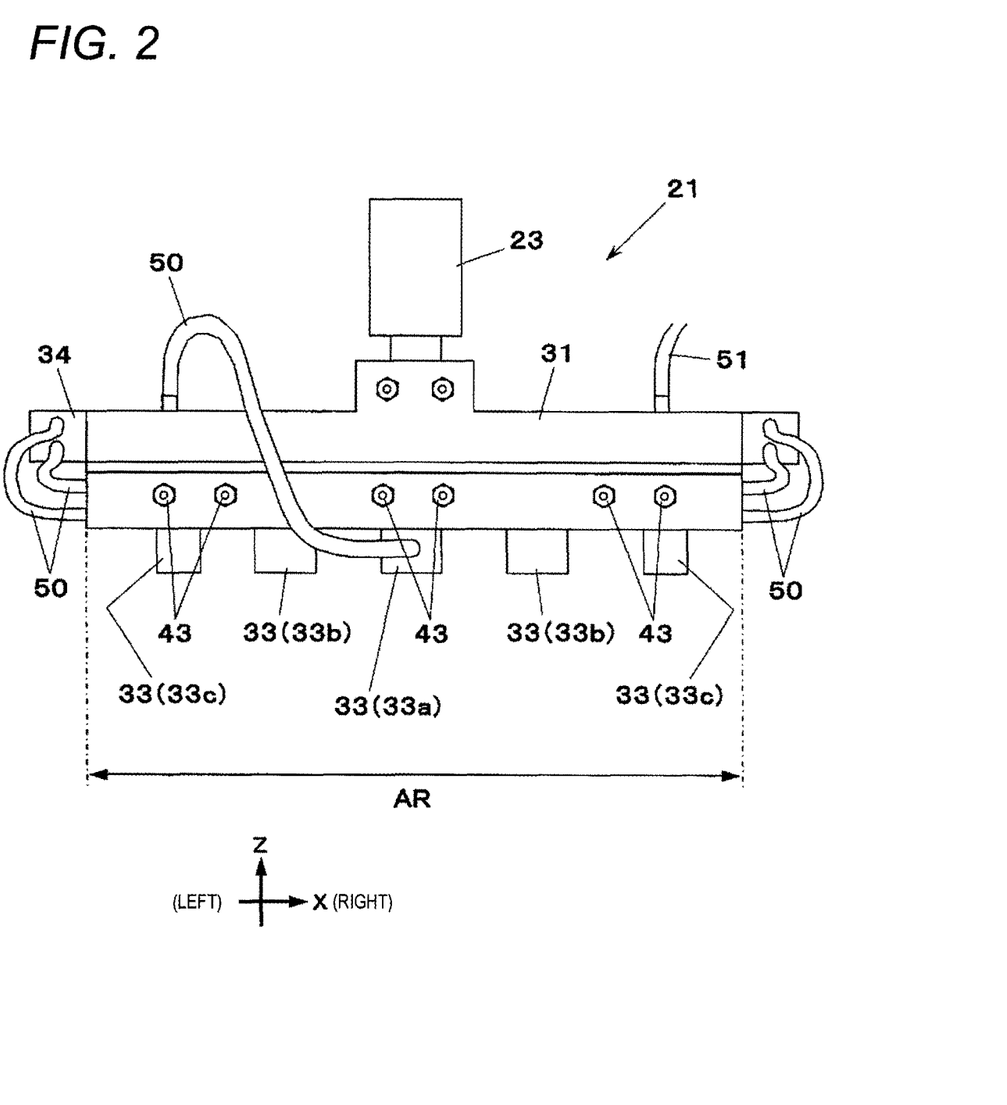
FIG. 2 is a front view of a bonding tool included in the component bonding device according to the embodiment of the present invention.
Figure 3A:
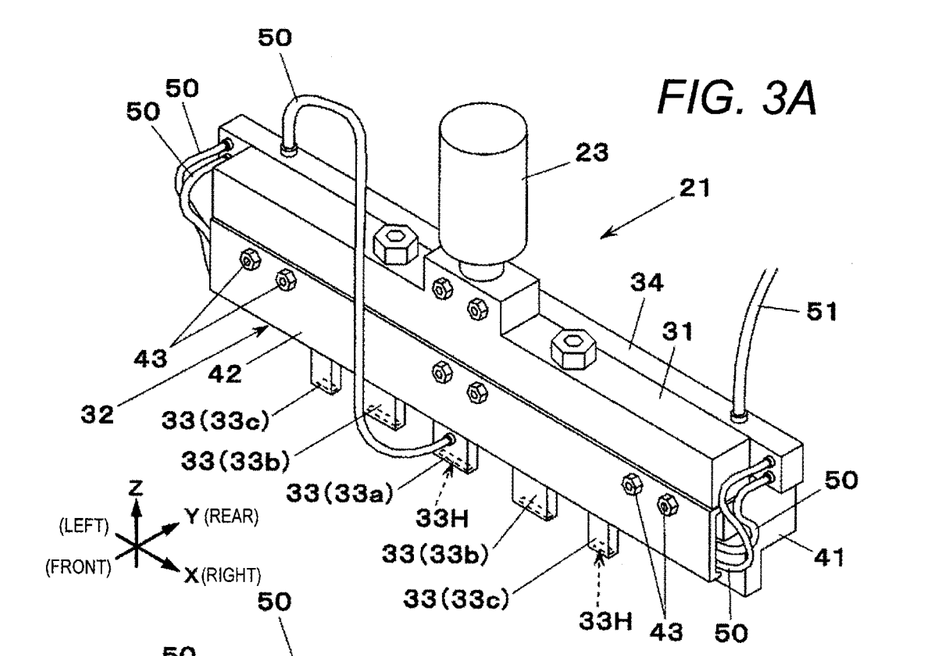
FIGS. 3A and 3B are perspective views of the bonding tool included in the component bonding device according to the embodiment of the present invention.
Figure 3B:
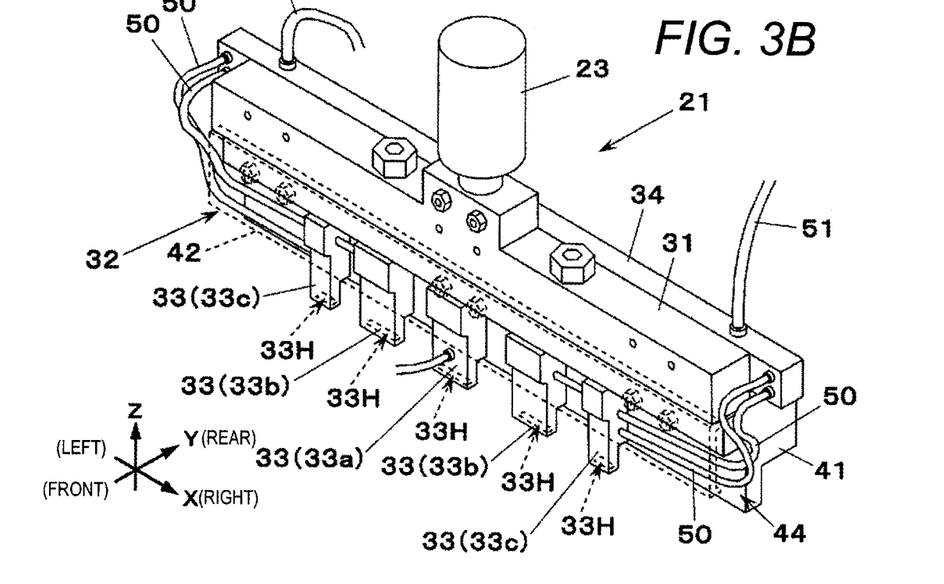

In FIGS. 2, 3A, and 3B, the bonding tool 21 has an elongated shape extending in the X-axis direction as a whole. The bonding tool 21 includes a base member 31 which is attached to a lower end of a piston rod 23a of the lifting cylinder 23, a suction block holding portion 32 which is disposed on a lower surface side of the base member 31, a plurality of suction blocks 33 (five suction blocks in this embodiment) which are held by the suction block holding portion 32, and a pipe member 34 which is disposed on a rear side of the base member 31.

The suction block holding portion 32 includes a rear surface side member 41 which is attached to a lower surface side of the base member 31, a front surface side member 42 which is arranged on a front surface of the rear surface side member 41, and a plurality of screws 43 which detachably attach the front surface side member 42 to the rear surface side member 41. A passage 44 extending in the X-axis direction and opened downward is formed between the front surface of the rear surface side member 41 and the rear surface of the front surface side member 42. The five suction blocks 33 are inserted into the passage 44, and are arranged in a row in the X-axis direction. The suction blocks 33 inserted into the passage 44 are held in a state where an upper half portion thereof is clamped in the Y-axis direction by the rear surface side member 41 and the front surface side member 42.

The suction block holding portion 32 has a block holding-available region AR (refer to FIG. 2) capable of holding the suction blocks 33, and holds the suction blocks 33 so as to be arranged in a row in the X-axis direction in the block holding-available region AR. The block holding-available region AR has the passage 44 which slidably guides the suction blocks 33, and can change a holding position of at least one of the suction blocks 33 in the suction block holding portion 32 by causing the corresponding suction block 33 to slide along the passage 44.

In FIGS. 2, 3A, 3B, and 4, a lower half portion of the suction block 33 protrudes downward from the suction block holding portion 32 in a state where the suction block 33 is held by the suction block holding portion 32. A suction hole 33H for sucking the film-like component 3 is formed in a lower end of the respective suction block 33. In this manner, the five suction holes 33H included in the five suction blocks 33 are arranged in the X-axis direction below the suction block holding portion 32. As used herein, among the five suction blocks 33, the suction block 33 arranged in the center is referred to as a center block 33a, and the two suction blocks 33 arranged laterally adjacent to the center block 33a are referred to as middle blocks 33b. In addition, the two suction blocks 33 arranged on the outer side of the three suction blocks 33 are referred to as end portion blocks 33c.

If the screws 43 of the suction block holding portion 32 are loosened, and the force for clamping the suction blocks 33 by the rear surface side member 41 and the front surface side member 42 is lowered, whereby the suction blocks 33 can be slid inside the above-described passage 44 (that is, in an arrangement direction of the suction blocks 33). In this manner, the suction blocks 33 can change a holding position at which the respective suction blocks 33 are held by the suction block holding portion 32. Thereafter, if the screws 43 are fastened, the suction blocks 33 can be held at the changed holding positions.

Figure 4:
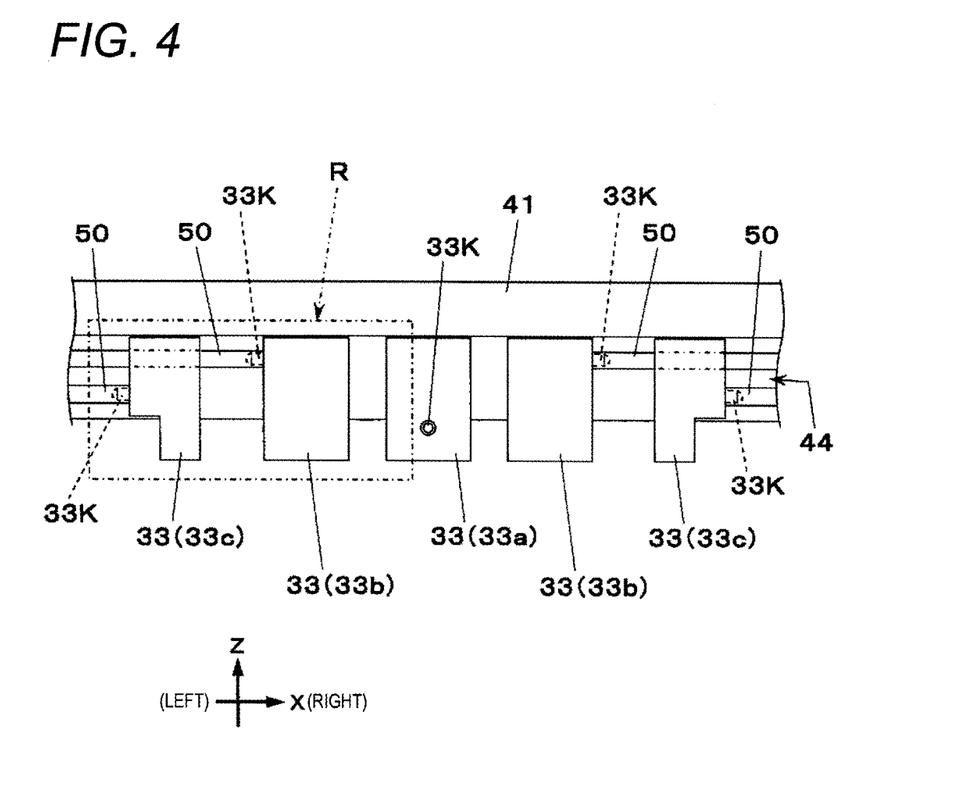
FIG. 4 is a partial front view of the bonding tool included in the component bonding device according to the embodiment of the present invention.
Figure 5A:
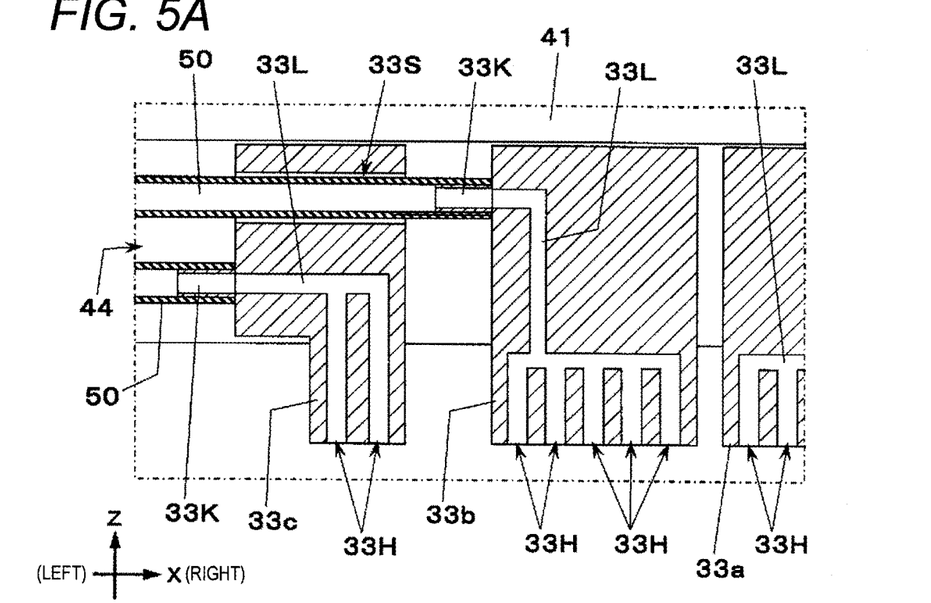
FIGS. 5A and 5B are partially enlarged sectional views of the bonding tool included in the component bonding device according to the embodiment of the present invention.
Figure 5B:
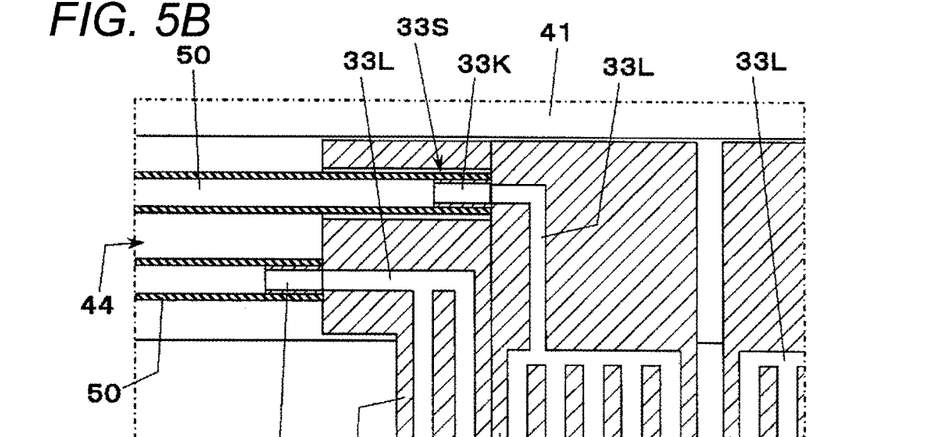

FIGS. 5A and 5B are enlarged sectional views of a region R in FIG. 4. In FIGS. 5A and 5B, an internal passage 33L connected to the suction hole 33H is formed in each of the suction blocks 33. The internal passage 33L has an opening on a front surface of the center block 33a, and an opening on a side surface of the other suction blocks 33. A pipe connector 33K is connected to each opening (refer to FIG. 4).

In FIGS. 3A, 3B and 4, one end of each of vacuum pipes 50 for supplying vacuum pressure is connected to corresponding pipe connector 33K, and the other end of each of the vacuum pipes 50 is connected to a pipe member 34. An internal pipe (not illustrated) for connecting the vacuum pipes 50 extending from the respective suction blocks 33 to one another is formed inside the pipe member 34. A vacuum pressure supply port 34P for supplying vacuum pressure to the internal pipe is disposed on an upper surface side of the pipe member 34. The vacuum pressure supply port 34P is connected to a vacuum pressure supply portion 52 by a vacuum pressure supply path 51 (refer to FIG. 1).

In FIG. 4, among the five suction blocks 33, the pipe connector 33K of the center block 33a protrudes forward from a front surface of the center block 33a. Each of the pipe connectors 33K of the laterally arranged middle blocks 33b protrudes outward from a side surface on each outer side thereof (side surface on the end portion block 33c side). In addition, each of the pipe connectors 33K of the laterally arranged end portion blocks 33c protrudes outward from the side surface on each outer side thereof.

In FIGS. 3A, 3B, 5A and 5B, the vacuum pipe 50 attached to the pipe connector 33K of the end portion block 33c extends to the outside from an end portion of the suction block holding portion 32. The vacuum pipe 50 attached to the pipe connector 33K of the middle block 33b extends inside a sleeve 33S formed to penetrate the adjacent end portion block 33c in the X-axis direction, and then extends to the outside from the end portion of the suction block holding portion 32. Instead of the sleeve 33S, a penetrating path may be provided in which the vacuum pipe 50 extends. Here, an axis of the sleeve 33S formed in the end portion block 33c is coincident with an axis of the pipe connector 33K of the middle block 33b. Therefore, if the middle block 33b and the end portion block 33c adjacent thereto are moved relative to each other in the X-axis direction, the vacuum pipe 50 attached to the middle block 33b moves in the axial direction inside the sleeve 33S disposed in the end portion block 33c. FIG. 5B illustrates a state where the middle block 33b and the end portion block 33c are brought into contact with each other.

If vacuum pressure is supplied from the vacuum pressure supply portion 52, the vacuum pressure is supplied to the internal passages 33L of the respective suction blocks 33 via the vacuum pressure supply path 51, the internal pipe, and the respective vacuum pipes 50 of the pipe member 34, thereby generating a suction force in the suction holes 33H of the respective suction blocks 33. The suction blocks 33 can be selectively detached from the suction block holding portion 32. However, each of the suction blocks 33 has an independent vacuum pressure supply path as described above. Accordingly, even when at least one of the suction blocks 33 is detached from the suction block holding portion 32, the vacuum pressure supply path does not affect the other vacuum pressure supply paths connected to the other suction blocks 33. Therefore, according to the present embodiment, the bonding tool 21 can be used in a state where an unnecessary suction block 33 is detached from the suction block holding portion 32 depending on the shape and size of the film-like component 3 as a bonding target.

Figure 6A:
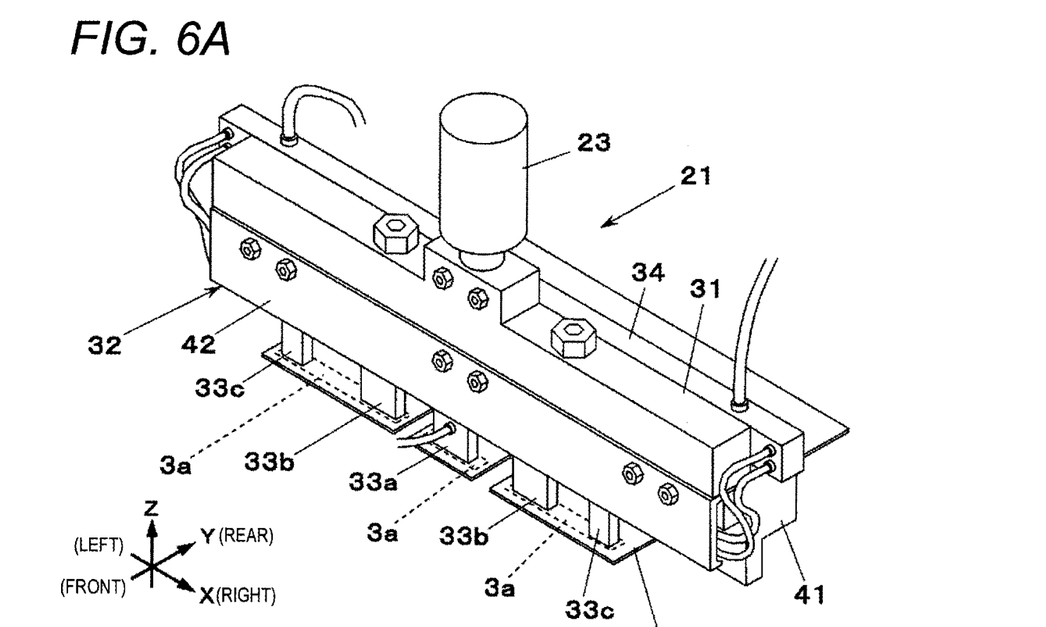
FIGS. 6A and 6B are views illustrating a state where a film-like component is sucked by the bonding tool included in the component bonding device according to the embodiment of the present invention.
Figure 6B:
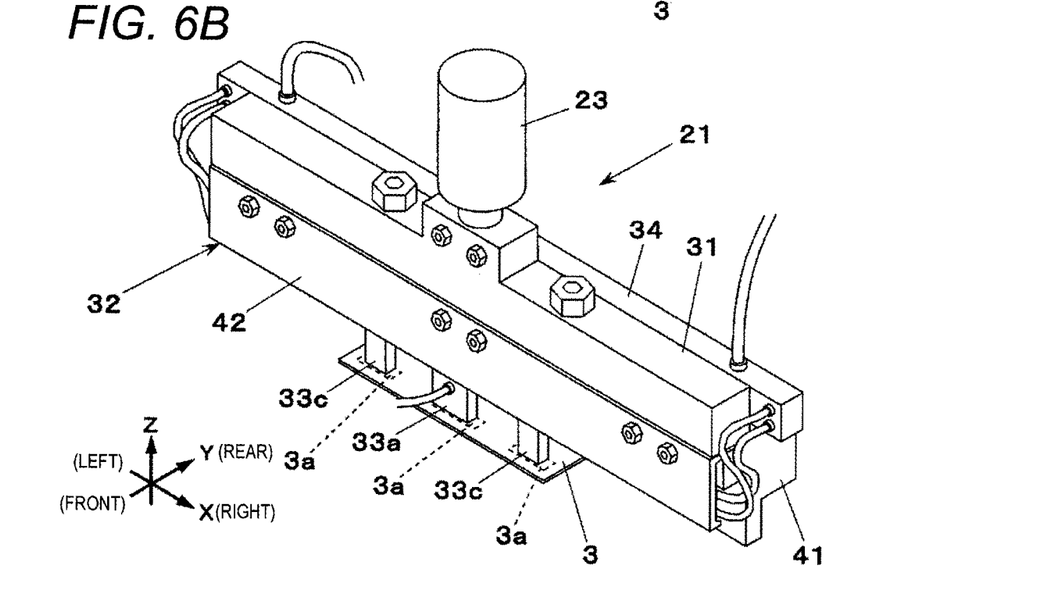
Figure 7:
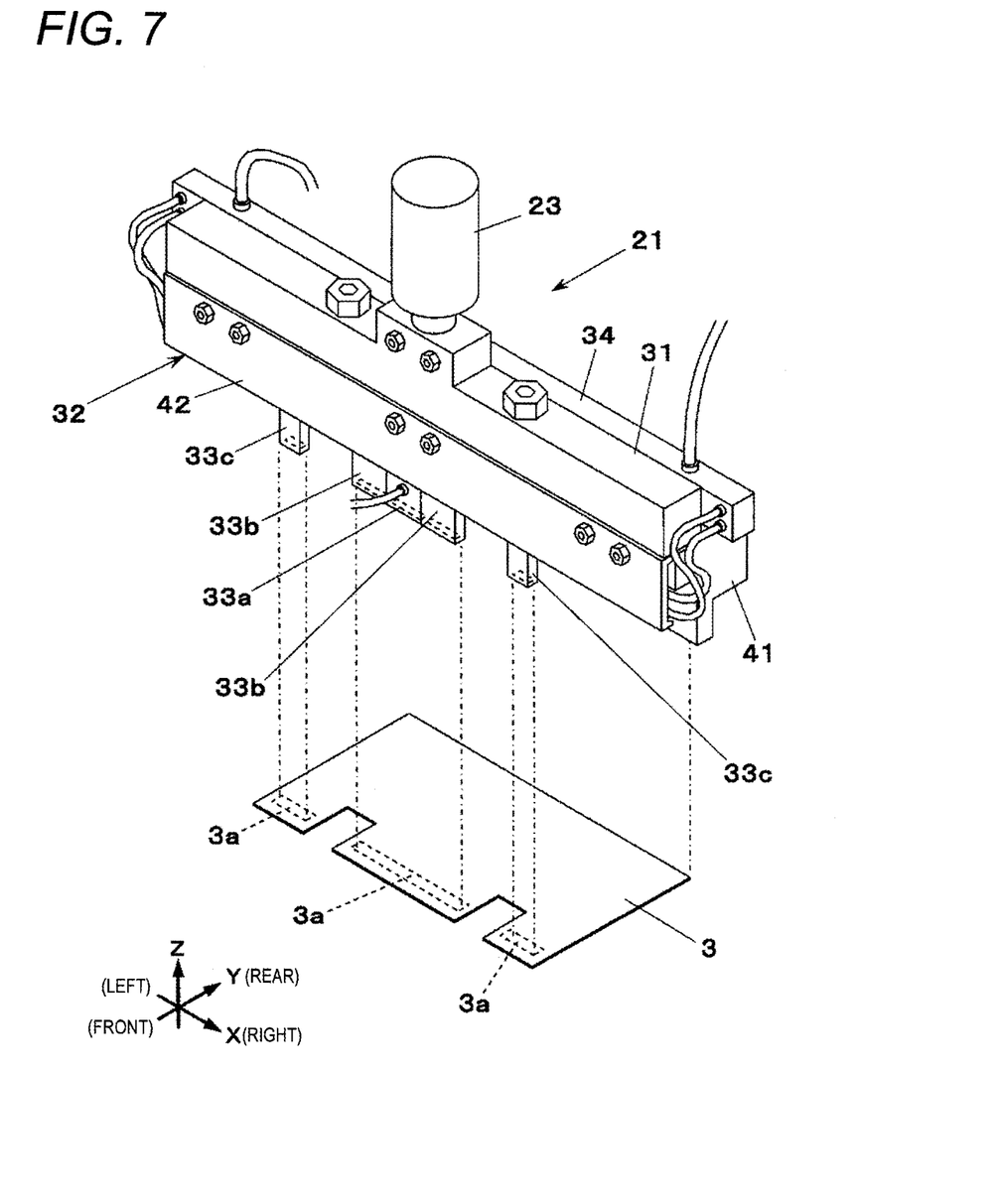
FIG. 7 is a view illustrating the bonding tool included in the component bonding device according to the embodiment of the present invention, together with the film-like component.

FIGS. 6A, 6B, and 7 illustrate an example where an arrangement (holding position) of the suction blocks 33 is changed depending on the shape and size of the film-like component 3 when a type of the film-like component 3 is changed. FIG. 6A illustrates an example where the five suction blocks 33 are arranged so that the center block 33a sucks an upper portion of the terminal 3a located at the center in the left-right direction of the film-like component 3, the middle block 33b and the end portion block 33c located on the left side suck the upper portion of the terminal 3a located on the left side of the center block 33a, and the middle block 33b and the end portion block 33c located on the right side suck the upper portion of the terminal 3a located on the right side of the center block 33a.

FIG. 6B illustrates an example where among the five suction blocks 33, the three suction blocks 33 are arranged so that the laterally arranged middle blocks 33b are detached from the suction block holding portion 32, then the center block 33a sucks the upper portion of the terminal 3a located at the center in the left-right direction of the film-like component 3, the end portion block 33c located on the left side sucks the upper portion of the terminal 3a located on the left side of the center block 33a, and the end portion block 33c located on the right side sucks the upper portion of the terminal 3a located on the right side of the center block 33a.

FIG. 7 illustrates an example where the five suction blocks 33 are arranged so that the center block 33a and the laterally arranged middle blocks 33b suck the upper portion of the terminal 3a located at the center in the left-right direction of the film-like component 3, the end portion block 33c located on the left side sucks the upper portion of the terminal 3a located on the left side of the center block 33a, and the end portion block 33c located on the right side sucks the upper portion of the terminal 3a located on the right side of the center block 33a. Here, the laterally arranged middle blocks 33b are brought into contact with the center block 33a.

The rear surface side member 41 of the suction block 33 has a heater 45 incorporated therein. The heater 45 generates heat, thereby enabling the suction blocks 33 to be heated through the rear surface side member 41.

In FIG. 1, the auxiliary tool 22 includes a plurality of suction portions 22H protruding downward. The suction portions 22H are connected to the vacuum pressure supply portion 52 by a vacuum pipe (not illustrated). Similarly to the suction hole 33H of the suction block 33 of the bonding tool 21, a suction force can also be generated in the suction portions 22H of the auxiliary tool 22.

In order to bond (temporarily bond) the film-like component 3 to the substrate 2 by the bonding head 15, the bonding head 15 first picks up the film-like component 3 by a suction force from the component supply portion 14. When the film-like component 3 is bonded, the bonding tool 21 sucks the upper portion of the terminal 3a of the film-like component 3 by using the suction hole 33H of the suction blocks 33, and the auxiliary tool 22 sucks a portion of the film-like component 3 excluding the upper portion of the terminal 3a by using the suction portions 22H. Before the bonding head 15 sucks the film-like component 3, an arrangement (holding position) of the suction blocks 33 included in the bonding tool 21 is changed depending on the shape and size of the film-like component 3 as necessary.

Figure 8A:
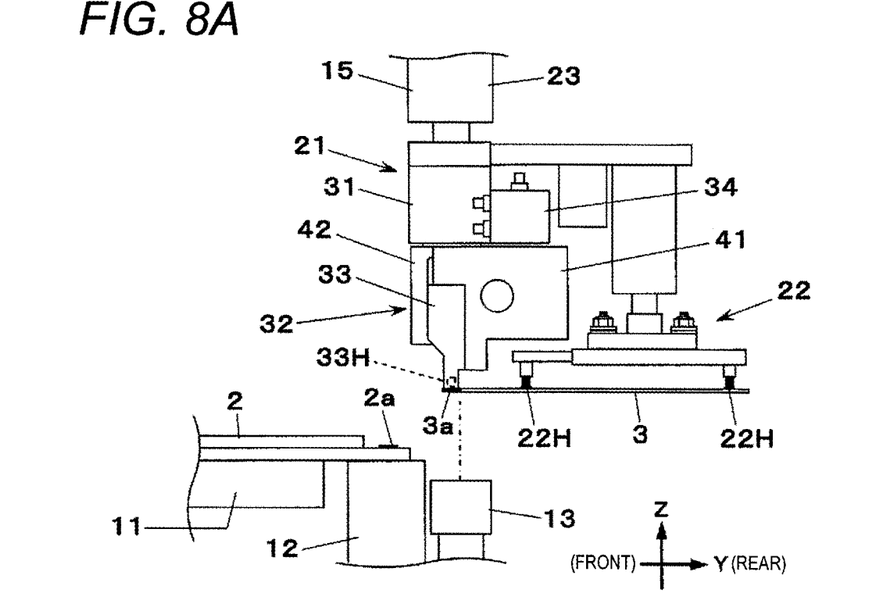
FIGS. 8A and 8B are views for illustrating an operation of the component bonding device according to the embodiment of the present invention.
Figure 8B:
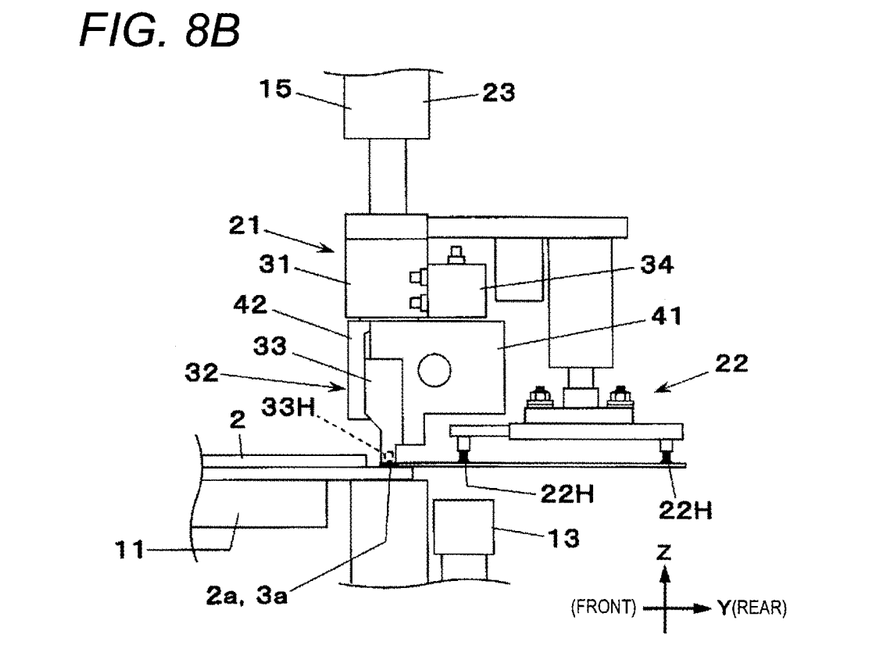

After the bonding tool 21 and the auxiliary tool 22 suck the film-like component 3, the bonding head 15 is moved such that the terminals 3a on the lower surface of the film-like component 3 are located above the camera 13. The camera 13 images the terminals 3a one by one (refer to FIG. 8A), and identifies a positions of the respective terminals 3a. Thereafter, the bonding head 15 is moved based on the identification result obtained by the camera 13, and the terminals 3a of the film-like component 3 are located above the respective electrode portions 2a of the substrate 2. Then, the lifting cylinder 23 lowers the bonding tool 21, the terminals 3a of the film-like component 3 are placed on the respective electrode portions 2a of the substrate 2, and in this state, the bonding tool 21 is pressed down (refer to FIG. 8B). In this manner, the film-like component 3 is pressed against and bonded to the substrate 2 whose lower surface is supported by the backup stage 12. When the film-like component 3 is bonded to the substrate 2, the heater 45 heats the suction blocks 33, and an adhesive tape material previously adhering to the electrode portion 2a of the substrate 2 is thermally hardened, thereby joining the terminals 3a of the film-like component 3 and the respective electrode portions 2a of the substrate 2 to each other.

As described above, according to the component bonding device 1 in the present embodiment, the suction blocks 33 having the suction holes 33H for sucking the film-like component 3 can change the holding positions in the suction block holding portion 32 to any desired positions. Accordingly, the change of the type of the film-like component can be settled easily by changing only the holding positions of the respective suction blocks 33 depending on a shape or a size of the film-like component 3. Therefore, according to the component bonding device 1 in the present embodiment, it is not necessary to prepare the dedicated bonding tools 21 for the respective types of the film-like components 3, and it is not necessary to carry out work for replacing the bonding tool 21 at the time of the change of the type of the film-like component.

What is claimed is:

1. A component bonding device comprising:
   a bonding tool that sucks a film-like component and bonds the film-like component to a substrate,
   a substrate holding portion that holds the substrate,
   a backup stage that supports a lower surface of the substrate held by the substrate holding portion, and
   a lifting cylinder configured to move the bonding tool up and down to bond the film-like component to the substrate,
   wherein the bonding tool comprises:
      a plurality of suction blocks, each of which has a suction hole for sucking the film-like component; and
      a suction block holding portion which has a block holding-available region capable of holding the plurality of suction blocks, and which holds the plurality of suction blocks so as to be arranged in a row in the block holding-available region, and
   wherein the suction block holding portion includes a first member and a second member which is arranged on a front surface of the first member,
   wherein the block holding-available region has a passage which is opened downward at the suction block holding portion and between the first member and the second member,
   wherein the plurality of the section blocks are clamped between the front surface of the first member and a rear surface of the second member and slidably guided along the passage
   wherein the suction block holding portion allows change of a holding position of at least one of the plurality of suction blocks to any desired position in the block holding-available region, and
   wherein the backup stage and each of the plurality of suction blocks sandwich the film-like component and the substrate and the film-like component is pressed against and bonded to the substrate when the lifting cylinder lowers the bonding tool.

2. The component bonding device according to claim 1, wherein at least one of the plurality of suction blocks is detachable from the suction block holding portion.

3. A component bonding device comprising:
   a bonding tool that sucks a film-like component and bonds the film-like component to a substrate,
   wherein the bonding tool comprises:
      a plurality of suction blocks, each of which has a suction hole for sucking the film-like component; and a suction block holding portion which has a block holding-available region capable of holding the plurality of suction blocks, and which holds the plurality of suction blocks so as to be arranged in a row in the block holding-available region, and wherein the suction block holding portion includes a first member and a second member which is arranged on a front surface of the first member, wherein the block holding-available region has a passage which is opened downward at the suction block holding portion and between the first member and the second member, wherein the plurality of the suction blocks are clamped between the first member and the second member and slidably guided along the passage, wherein the suction block holding portion allows change of a holding position of at least one of the plurality of suction blocks to any desired position in the block holding-available region, and, wherein the component bonding device further comprises:

a heater that heats the plurality of suction blocks, wherein the heater is provided in either the first member or the second member.

4. A component bonding device comprising:

a bonding tool that sucks a film-like component and bonds the film-like component to a substrate, a substrate holding portion that holds the substrate, a lifting cylinder configured to move the bonding tool up and down to bond the film-like component to the substrate, wherein the bonding tool comprises:

a plurality of suction blocks, each of which has a suction hole for sucking the film-like component; and a suction block holding portion which has a block holding-available region capable of holding the plurality of suction blocks, and which holds the plurality of suction blocks so as to be arranged in a row in the block holding-available region, and wherein the suction block holding portion includes a first member and a second member confronting the first member, wherein the block holding-available region has a passage which is opened downward at the suction block holding portion and between the first member and the second member, wherein each of the plurality of the suction blocks has a first face, a second face on a reverse side from the first face, a third face between the first face and the second face, and a fourth face on a reverse side from the third face and provided with the suction hole, wherein the first member has a first face in contact with the first face of the each of the plurality of the suction blocks, and a second face in contact with the third face of the each of the plurality of the suction blocks, wherein the second member has a face opposite the first face of the first member and in contact with the second face of the each of the plurality of the suction blocks, wherein the plurality of the suction blocks are clamped between the first face of the first member and the face of the second member and slidably guided along the passage, wherein the suction block holding portion allows change of a holding position of at least one of the plurality of suction blocks to any desired position in the block holding-available region, and wherein the film-like component is pressed by the fourth face of each of the plurality of suction blocks against the substrate and bonded to the substrate when the lifting cylinder lowers the bonding tool.

5. The component bonding device according to claim 4, further comprising:

a backup stage having an upper face that supports a lower surface of the substrate held by the substrate holding portion, wherein the backup stage and the forth fourth face of each of the plurality of suction blocks sandwich the film-like component is pressed against and bonded to the substrate whose lower surface is supported by the backup stage when the lifting cylinder lowers the bonding tool, and wherein the second face of the first member is opposed to the upper face of the backup stage.

* * * * *